United States Patent
Gustafson et al.

[11] 3,875,663
[45] Apr. 8, 1975

[54] INDEXABLE CUTTING INSERT

[75] Inventors: Manfred W. Gustafson; S. Helge Wilback; Rune Ljungqvist, all of Fagersta, Sweden

[73] Assignee: SECO Tools AB, Fagersta, Sweden

[22] Filed: Nov. 8, 1972

[21] Appl. No.: 304,811

[30] Foreign Application Priority Data
Nov. 12, 1971 Sweden............................ 14490/71

[52] U.S. Cl................................................ 29/95 R
[51] Int. Cl................................................ B26d 1/00
[58] Field of Search................................. 29/95, 96

[56] References Cited
UNITED STATES PATENTS

| | | | |
|---|---|---|---|
| 2,677,170 | 5/1954 | Kuns et al................................ | 29/95 |
| 2,870,523 | 1/1959 | Richard.................................... | 29/96 |
| 3,381,349 | 5/1968 | Newcomer............................. | 29/95 X |
| 3,395,434 | 8/1968 | Wirfelt.................................... | 29/95 |
| 3,792,515 | 2/1974 | Lundgren................................ | 29/95 |

FOREIGN PATENTS OR APPLICATIONS
383,423   1/1923   Germany................................ 29/95

*Primary Examiner*—Andrew R. Juhasz
*Assistant Examiner*—W. R. Briggs
*Attorney, Agent, or Firm*—Flynn & Frishauf

[57] ABSTRACT

An indexable insert for chip cutting machining has a chip breaking groove along each cutting edge on at least one broad face thereof. The inner edge of the chip breaking groove lies on a level with or ahead of (in the cutting direction) the cutting edge, and the broad face of the insert, inside of each cutting edge chip breaking groove, forms a substantially flat plane inclined downwardly from the groove edge towards the insert center, to thereby minimize the contact area between chip and insert, thereby reducing the transfer of heat from the chip to the insert and improving the service durability of the insert.

4 Claims, 16 Drawing Figures

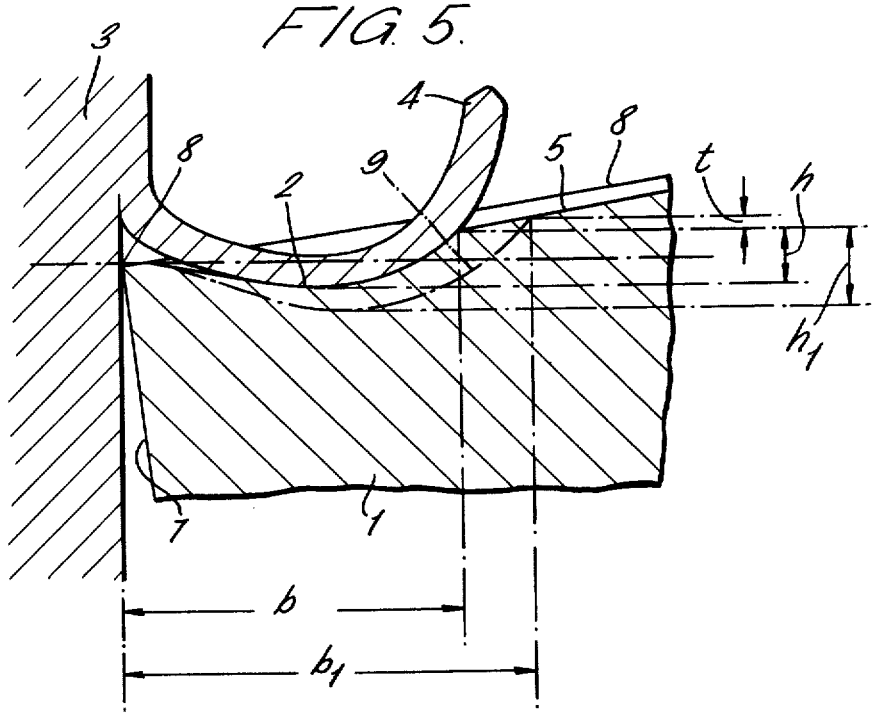
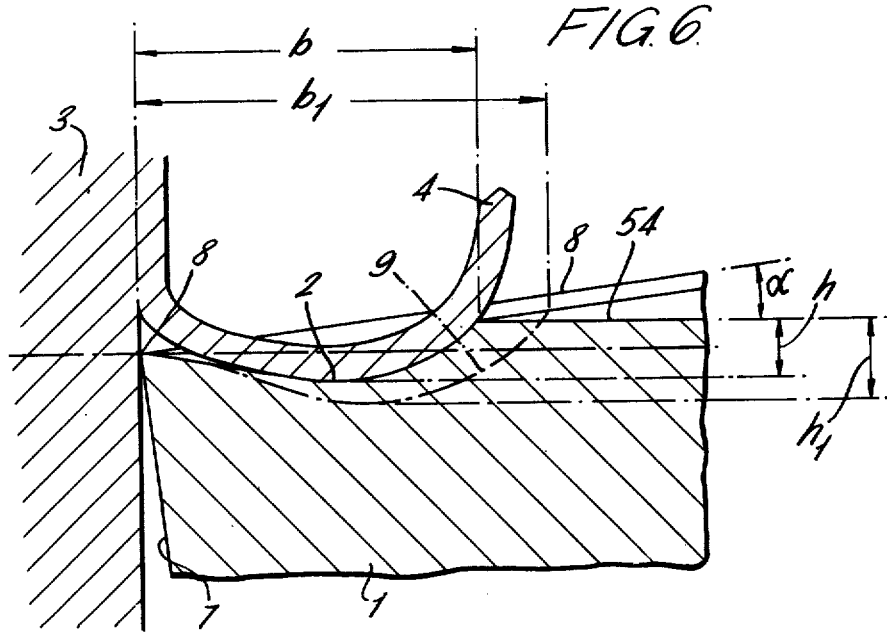

INDEXABLE CUTTING INSERT

The present invention refers to an indexable insert, and more particularly to a through hole insert for chip cutting machining of the type including a moulded in chip breaker, i.e., an insert having a groove moulded in or ground in along each cutting edge, and which groove serves to break the chips to a manageable size.

Such inserts with moulded in chip breakers of known design correspond substantially to a common insert for negative or positive cutting rake angle with the exception of the chip breaker groove along the cutting edge.

The object of the present invention is to provide an insert with a moulded in chip breaker having such a configuration that the contact area between chip and insert is a minimum whereby less heat is transferred from the chip to the insert and whereby a favourable effect is attained as to the service durability of the insert. Moreover the design of the insert has a favourable effect on the profile that the chip groove is worn at low rate of feed.

SUMMARY OF THE INVENTION

The insert according to the invention is characterized in that the broadside of the insert inside the chip breaking groove of each cutting edge constitutes a substantially flat plane which is inclined downwardly towards the insert centre.

Embodiments of the insert according to the invention are described in detail in the following specification with references to the attached drawings.

FIG. 5 shows a part of an insert according to FIG. 1 in working position illustrating the chip breaking process and the wear of the insert at a low amount of feed.

FIG. 6 shows a part of the insert according to FIGS. 2 and 3 in working position against a work piece and illustrates the chip breaking process and the wear of the insert at a low feed.

DETAILED DESCRIPTION OF DRAWINGS

Figure 1:
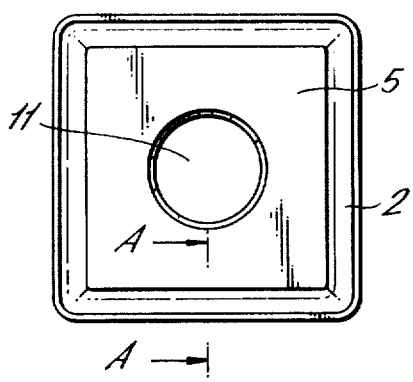
FIG. 1 is a plan view of a known design of a through hole insert with a moulded in chip breaker designed for negative cutting rake angle.
Figure 1A:
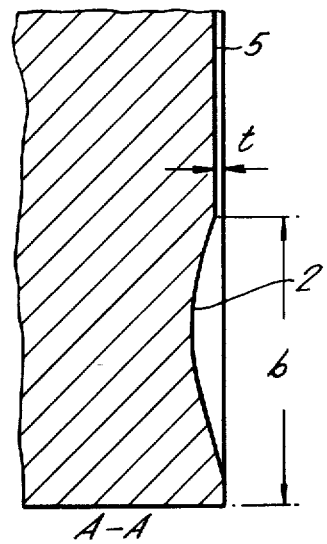
FIG. 1a is an enlarged sectional view along line A — A in FIG. 1.

Inserts with moulded chip breaker of the type shown in FIG. 1 are known in various designs. The dimension $t$ in FIG. 1a varies as to its magnitude and can be positive as well as negative i.e. lie above as well as below the cutting edge. Moreover the dimension b varies.

Figure 7:
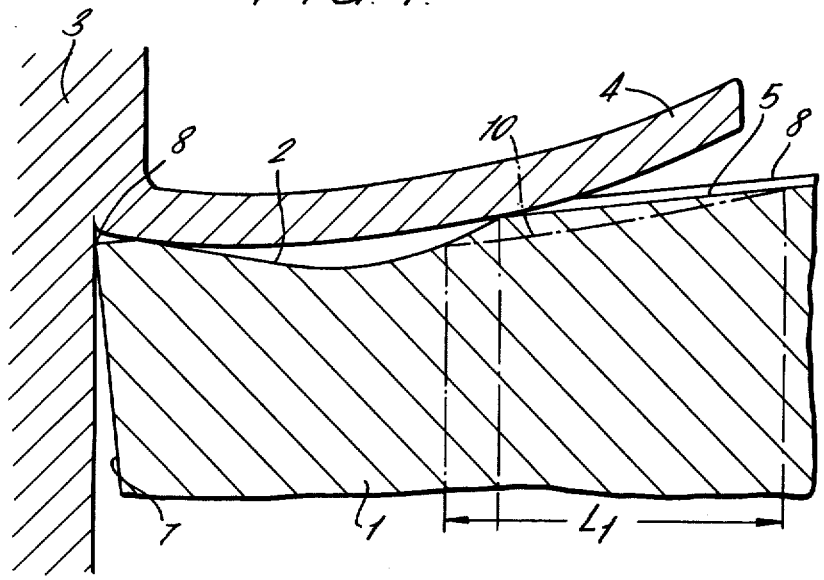
FIG. 7 shows part of an insert according to FIG. 1 in working position against a work piece and illustrates the chip breaking process and the wear of the insert at a high feed.

When an insert with moulded in chip breaker according to FIG. 1 works in a long chipping material with a low amount of feed the chips 4 from the work piece 3 follow the chip groove 2 on the insert 1 in the manner illustrated in FIG. 5. At successively increased feed the chips 4 will adopt a more straight shape as illustrated in FIG. 7. As shown in FIG. 7, the chip groove 2 then successively goes out of action at the same time as the chip breaking work is taken over by the adjacent plane 5 which forms an angle of 90° to the insert clearance face 7 and which is parallel to the insert cutting edge 8.

During the successive wear of the insert according to FIG. 1 two processes which are unfavourable for the service durability of the insert appear. When working with a low feed as illustrated in FIG. 5 the chip groove 2 is worn down successively to the surface 9 and thus to a greater depth i.e., from $h$ to $h_1$ and a larger width i.e., from $b$ to $b_1$. Due to this wear of groove 2, the contact area between chip and chip groove is increased at the same time as the ratio between the depth and width of the chip groove is changed in a manner that contributes to an increased chip breaking work. The increased chip breaking work raises the temperature of the chips and of the cutting insert at the same time as the increased contact area allows greater heat transfer from chip to insert, this combination of circumstances being together a drawback for the service durability of the insert.

At a high feed when the chips have the shape shown in FIG. 7 a similar effect appears. When the shape of the chips at an increased feed approaches the tangent to the cutting insert inner plane 5 a rapidly growing wear surface 10 arises contributing to an increased heat transfer from chip to insert. $L_1$ in FIG. 7 indicates the magnitude of the wear.

Figure 2:
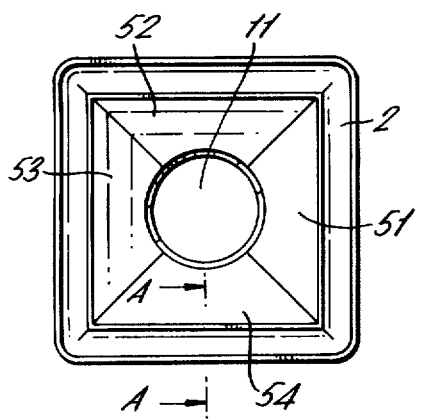
FIG. 2 is a plan view of an insert according to the present invention for negative cutting rake angle.
Figure 2A:
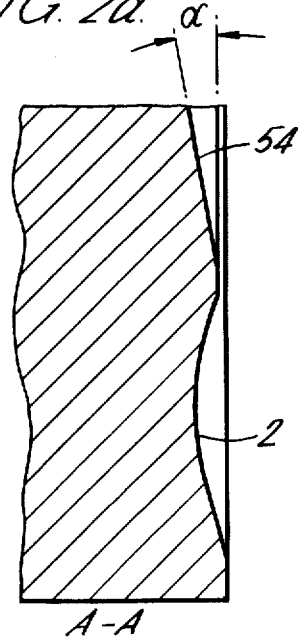
FIG. 2a is an enlarged sectional view along line A — A in FIG. 2.
Figure 4:
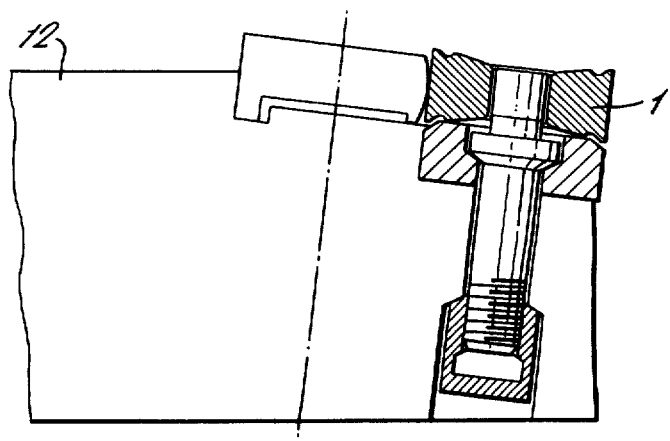
FIG. 4 is a view of the insert according to FIG. 3 as fitted in a tool holder together with an anvil.

The insert according to the invention does reduce the drawbacks elucidated above. In FIG. 2 is illustrated as an example of the invention a square insert differing as to its design from the insert according to FIG. 1 in that the inner plane 5 adjacent to the chip groove 2 is divided into four plane surfaces 51, 52, 53 and 54, which are inclined downwardly to the insert centre 11 at an angle $\alpha$. See FIG. 2a. In the specification and on the drawings the angle $\alpha$ has been chosen equal to the negative inclination of the insert when the same is fitted in a tool holder 12 as illustrated in FIG. 4. Within certain limits this angle $\alpha$ can be further increased whereby an increased effect is attained.

In FIG. 6 is shown how the depth of the chip groove increases by a lesser degree than according to the prior art insert of FIG. 5. The dimension $t$ in FIG. 5 has no equivalent in FIG. 6 where the plane 5 adjacent to the chip groove is horizontal. The design according to FIG. 6 thus implies a reduction of the chip breaking work and a reduction of the contact surface between chip and insert and thus a reduced detrimental effect.

Figure 8:
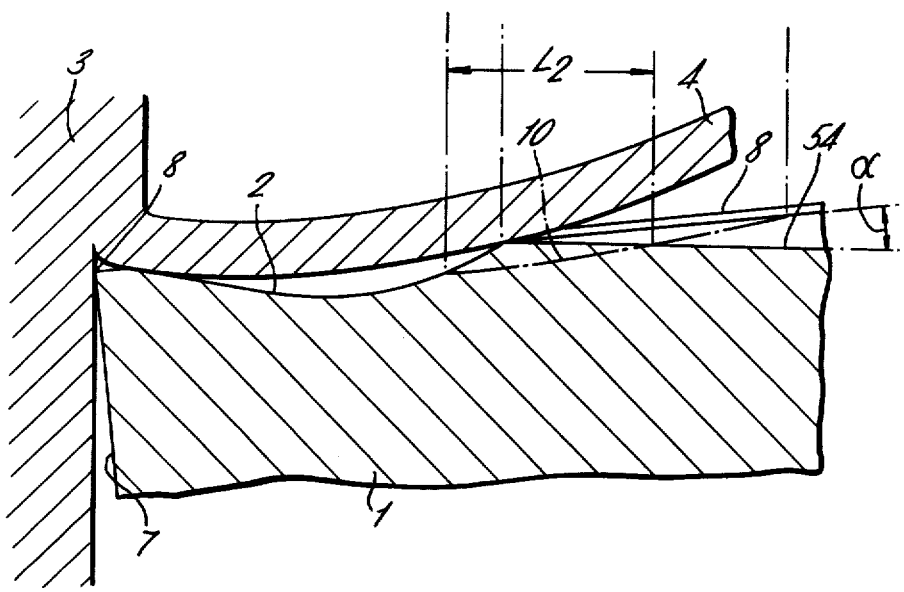
FIG. 8 shows an insert according to FIGS. 2 and 3 in working position against a work piece and illustrates the chip breaking process and the wear of the insert at a high speed.
Figure 9A:
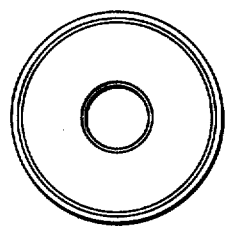
FIGS. 9a, 9b, 9c, 9d and 9e illustrate examples of various embodiments of the insert within the scope of the present invention.
Figure 9B:
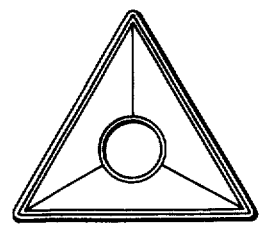
Figure 9C:
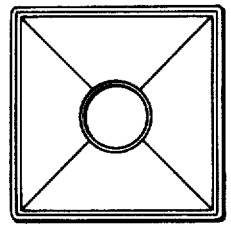
Figure 9D:
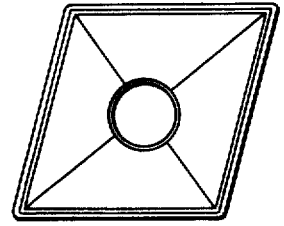
Figure 9E:
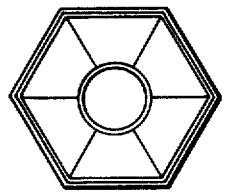

In FIG. 8 is shown how the contact surface between chip and insert increases to a lesser degree during the wear period than what is shown in FIG. 7. The angle $\alpha$ contributes also in this case to a smaller contact surface and less heat transfer from chip to insert.

Figure 3:
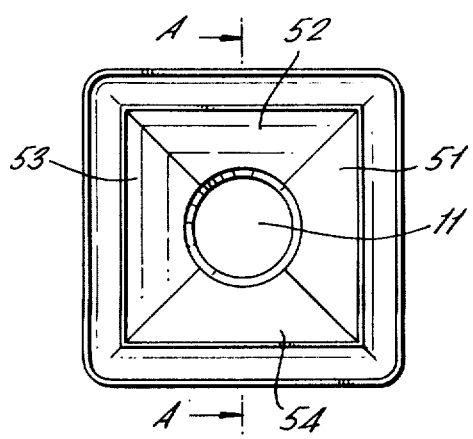
FIG. 3 is a plan view of an insert of the type shown in FIG. 2 but having cutting edges on both broad faces.
Figure 3A:
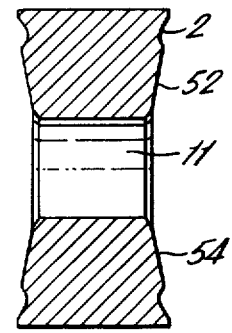
FIG. 3a shows a sectional view along line A — A in FIG. 3.

FIG. 3 shows an insert according to the invention having cutting edges on both of its broad faces. In other respects the design is the same as for the insert according to FIG. 2.

Besides the embodiments shown in FIGS. 9a, 9b, 9c, 9d and 9e the design of the present invention can of course also be applied to inserts for positive cutting rake angles.

We claim:

1. A cutting insert of regular polygonal form having: broad top and bottom surfaces with interconnecting side faces; a cutting edge at the intersection of said side faces with at least one of said broad surfaces; and a chip breaker in the form of a groove provided for each said cutting edge, said chip breaker groove being in said at least one broad surface of the insert and extending longitudinally along the cutting edge between the cutting edge and the center of the insert;

characterized in that:

the central region of the insert being formed by and including a plurality of planar surfaces, each of which slopes downwardly toward the other of said broad surfaces from the inner edge of the chip breaker groove and extends to a central portion of the insert; and said planar surfaces extending between lines formed by the bisectors from the insert corners to the geometric center of the insert.

2. Insert according to claim 1 characterized in that three of said downwardly sloping planar surfaces are formed in said central region and that said downwardly sloping planar surfaces form congruent triangles.

3. Insert according to claim 1, characterized in that a plurality of said downwardly sloping planar surfaces are formed in said central region and that said downwardly sloping planar surfaces form triangles which are congruent in pairs.

4. Insert according to claim 1 having a through hole extending through the center thereof and extending through said broad surfaces.

* * * * *